United States Patent [19]

Cesaro et al.

[11] Patent Number: 5,533,118
[45] Date of Patent: Jul. 2, 1996

[54] VOICE ACTIVITY DETECTION METHOD AND APPARATUS USING THE SAME

[75] Inventors: Claude Cesaro, Le Cannet; Gerard Richter, Saint Jeannet, both of France

[73] Assignee: International Business Machines Corporation, Armonk, N.Y.

[21] Appl. No.: 202,615

[22] Filed: Feb. 28, 1994

[30] Foreign Application Priority Data

Apr. 29, 1993 [EP] European Pat. Off. ............. 93480048

[51] Int. Cl.⁶ .................................................. H04M 1/00
[52] U.S. Cl. ..................... 379/386; 379/351; 379/282; 379/283; 379/80
[58] Field of Search ........................ 379/386, 100, 379/112, 282, 283, 284, 285; 381/43, 44, 45, 46

[56] References Cited

U.S. PATENT DOCUMENTS

| | | | |
|---|---|---|---|
| 4,042,788 | 8/1977 | Richards | 379/283 |
| 4,667,065 | 5/1987 | Bangerter | 379/351 |
| 4,764,966 | 8/1988 | Einkauf et al. | 379/351 |
| 4,979,214 | 12/1990 | Hamilton | 381/46 |
| 5,321,475 | 6/1994 | Drory et al. | 379/282 |
| 5,325,425 | 6/1994 | Novas et al. | 379/112 |

FOREIGN PATENT DOCUMENTS

| | | |
|---|---|---|
| 0222083 | 5/1987 | European Pat. Off. . |
| 0341128 | 7/1987 | European Pat. Off. . |
| 0228096 | 7/1987 | European Pat. Off. . |

OTHER PUBLICATIONS

27th Midwest Symposium on Circuits and Systems pp. 258–260.
Globecom, vol. 3, Nov. 28, 1988 pp. 1419–1427. A DSP Implemented Speech/Voiceband Data Discriminator, para. 3.1.

*Primary Examiner*—Jeffery Hofsass
*Assistant Examiner*—Jacques Saint-Surin
*Attorney, Agent, or Firm*—Joscelyn G. Cockburn; John B. Frisone

[57] ABSTRACT

A method for detecting the presence of voice, single tone and dual tone signals compares a ratio r which equals the square of the maximum value of the received signal (A max) during a sampling period divided by a measure E of the energy to three different thresholds. If r is less than the first threshold (3) a single tone is indicated. If it is greater than the first but less than the second (5.2) a dual tone is indicated. If it is greater than the second, the received signal level is compared to the third threshold (−43 dB) and receipt of a voice signal is indicated if the level of the received signal exceeds this threshold.

11 Claims, 7 Drawing Sheets

VOICE ACTIVITY DETECTION METHOD AND APPARATUS USING THE SAME

TECHNICAL FIELD

The invention relates to voice detection in the telecommunication field and particularly to a method and apparatus for discriminating the voice signals from the numerous call-progress signals which are conveyed on the telephone lines.

BACKGROUND ART

The detection of some voice-activity appears to be a key problem for telecommunication engineers since more and more equipments, ranging from the simpler fax machines to the more sophisticated voice-procession application systems, are likely to be connected to a common Private Switched Telephone Network (PSTN).

U.S. Pat. No. 5,070,526 is an example of a prior art system for analysing a digital representation of a signal to detect call progress signals which are periodic as compared to voice signals which are of essentially random frequency content within the audible frequency band. In this system, an analog communication signal transmitted over a telephone line is converted to digital form for storage in the memory of a computer. Segments of the, digital representation of the signal are analysed to determine whether or not the signal has uniform frequency components repeating at regular intervals.

Figure 1:
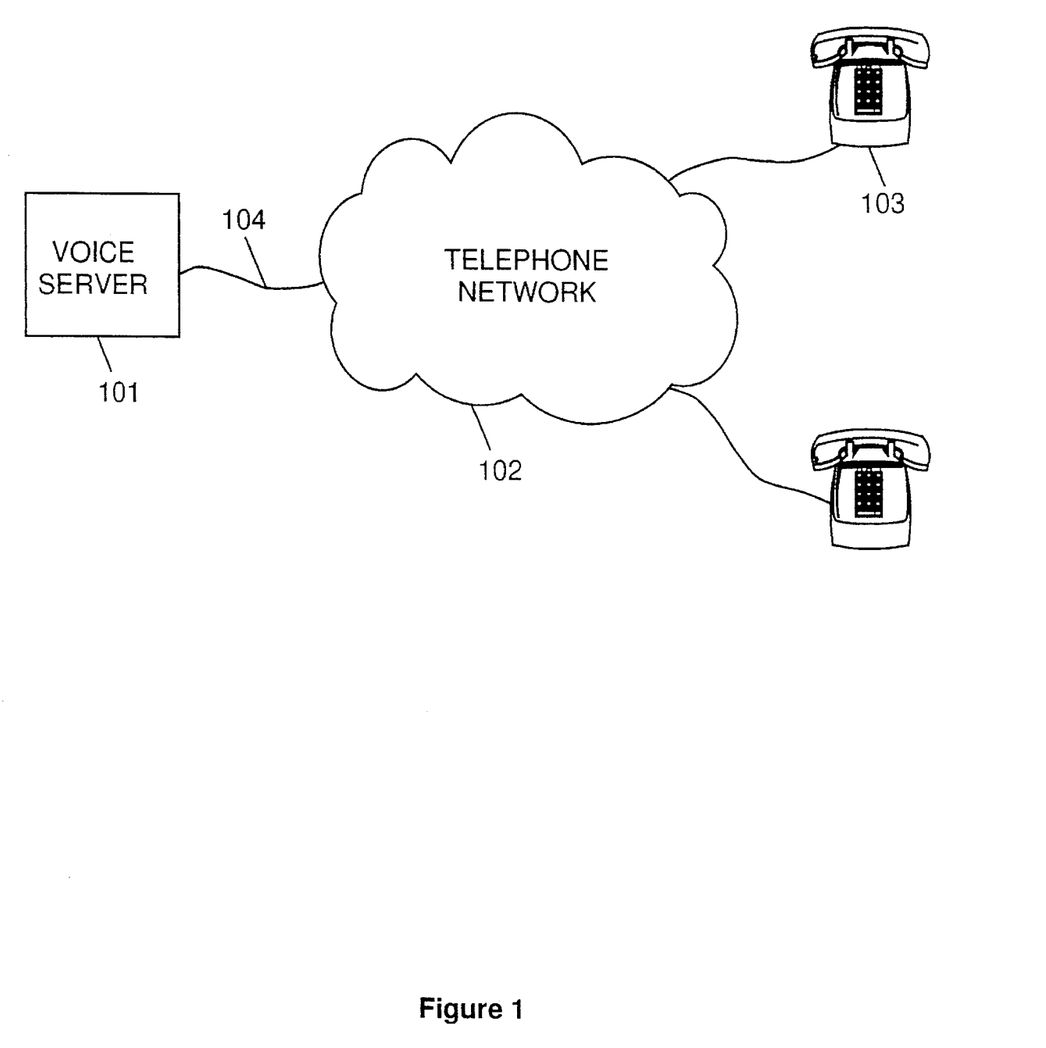
FIG. 1 is a schematic diagram of a voice-server application which can advantageously incorporate the tone-detection process according to the present invention.

The problem of voice-activity detection is particularly important in the case of voice-server applications providing the transmission of an understandable vocal messages from one system on one side of the telephone line to a human being on the other side. Two different types of calls can be found in such systems according the caller. A first type is often referred to as an "in-coming" call which applies to the telephone communications which are initiated by a person who has dialed the telephone number of a voice-server application, in the case of mail-order business application for instance. Conversely, in some more sophisticated systems, the call may also be initiated by the machine which performs the required dialing operations in order to call a private telephone subscriber and delivers some vocal messages. The second type of call is referred to as a "out-going" call. Considering, for instance, the case of a air-flight booking service application as illustrated in FIG. 1. A voice server 101 provides some air-flight reservation services is connected to a PSTN network 102 and can therefore contact a determined private telephone set 103. Assuming that one specific flight has been subject of a cancellation, it is highly desired that all the persons having booked one seat been informed of the cancellation that has occured. Therefore, the voice-server 101 will have to initiatie a serie of telephone communication calls by dialing the telephone numbers of the telephone subscribers being registered for the considered cancelled flight, manage the different call-progress procedures, recognize whether a person is on the other side of the line, and, at last, delivers a vocal message informing that person of the cancellation that has occured. In the case where the telecommunication call did not succeed, the voice-server will try later on.

Multiple tones are likely to be used in the telephone systems as there are the various control and call status information which are commonly known as call progress tones which are typically transmitted by a central office and transmitted to a calling party in order to keep this party informed of the current status of the call.

Additionaly, considering the fact that such voice-server applications are likely to be used on an international scale, thoses systems must absolutely be capable of handling the numerous call-progress procedures which exist in the world. Therefore, the system will have to process and recognize the wide number of existing tones which are used in the different PSTN existing in the world. A high level of discriminiation is desired in order to provide an accurate discrimination of the different tones conveyed through the network, i.e. the dial-tone, ring-back tone, busy tone, alerting tones, reorder tone, etc. . . . having a different frequency value in each country.

Considering the common dial-tone signal: while the dial-tone signal has a frequency value of 440 Hz in France, the same consists of a 425 Hz tone having a specific cadence in Italy, and is a continuous tone made by combining signals having frequencies of 350 Hz and 440 Hz in the U.S.

Further, since the call may be also be completed with the use of the Dual Tone Multi-Frequency (DTMF) tones, particularly in use in advanced facsimile systems or still rapidly expanding voice-server applications, being one of sixteen combinations of four frequencies from a high-frequency group and four frequencies from a low-frequency group, which is issued when a push button is depressed on the telephone and familiarly called a push tone or a dial tone.

Generally speaking, the tone determination and voice activity detection in the telecommunication systems are either based on a sophisticated Fast Fourier Transformation (FFT), or the use of digital band-pass filters being adjusted at the desired frequencies to be detected. The former systems necessitate a great deal of digital processing resources and the latter can not easily adjusted to match the wide range of tones which exists in the different countries.

Therefore, there is a need in the telecommunication industry for a simple voice-detection process which additionaly provides the detection of the call-progress tones which are likely to exist in the different countries of the world and does not require a great amount of digital processing resources.

SUMMARY OF THE INVENTION

The problem to be solved by the present invention is to provide a simple voice-detection method for a call-progress mechanism which allows an accurate detection of at least one tone in a received signal, and which still can be adjusted to match a wide variety of different frequency values.

This problem is solved by the voice-activity detection method according to the present invention which involves the steps of:

computing the value of the ratio, $$\frac{A_{max}^2}{E}$$

where Amax corresponds to the maximum value of the received signal during a sampling window and E a measure of the energy, comparing said computed ratio to a first determined threshold value, reporting the existence of a unique tone when said ratio appears to be lower than said first threshold value.

Additionaly, that ratio is compared to a second threshold value, and if it appears to be inferior, the system will report the existence of a dual tone in the received signal and then will initiate the dual-tone processing operations. Conversely, if the ratio appears to be higher than the second threshold value, and assuming that the level of the received signal is superior a value of about −43 dBm, the system will conclude of the existence of some voice-activity in the received signal and will report that information to the voice-server application.

Preferrably, the determination of the value of the frequency of the single or dual tone involves the steps of:

- applying a second-order or fourth-order autoregressive process in response to said determination and performing a first estimation of the autoregressive parameters of said received signal,
- performing a digital band-pass filtering operation adjusted to the result of the estimation of said autoregressive parameters to provide a partial elimination of the noise existing on said received signal,
- reapplying a second-order or fourth-order autoregressive process in response to said determination and performing a final estimation of the autoregressive parameters of said received signal,
- computing the values of the frequencies of each tone from the value of said estimated parameters.

In the preferred embodiment of the invention, the determination whether one or two different tones actually exist in the received signal is achieved by the computation of the following ratio:

$$\frac{A_{max}^2}{E}$$

Since this ratio should be equal to 2 in the case of an unique tone and 4 in that of a dual-tone, the computation of the latter provides a simple way to determine the number of tones present in the signal.

Preferably, the first and final second-order autoregressive process are based on the predicting function having the z-transfer function:

$$\frac{1}{a_1 \times z^{-1} + a_2 \times z^{-2}}$$

and which is associated with a Least Mean Square algorithm continuously adapting the parameters of the predictor in a sense allowing the minimizing of an error signal.

In the preferred embodiment of the invention, the first and final fourth-order autoregressive process are based on the predicting function having the z-transfer function:

$$\frac{1}{a_1 \times z^{-1} + a_2 \times z^{-2} + a_3 \times z^{-3} + a_4 \times z^{-4}}$$

and also associated with a corresponding Least Mean Square algorithm.

Preferably, in order to decrease the DSP resources, and also to enhance the accuracy of the tone-detection mechanism, the second-order autoregressive process is performed with the value of a2 parameter being constantly fixed to −1. On the other hand, the fourth-order autoregressive process is performed with the values of a3 and a4 being respectively equal to a1 and −1.

Preferably, the digital filtering operation, when an unique tone is to be processed, is based on a digital filter having the z-transfer function:

$$\frac{1}{1 - 2\mu \cos(2\Pi F \Delta t) \times z^{-1} + \mu^2 \times z^{-2}}$$

In the case of a dual-tone, the digital filtering operation is based on the following z-transfer function:

$$\frac{1}{1 - 2\mu \cos(2\Pi F_1 \Delta t)z^{-1} + \mu^2 z^{-2}} + \frac{1}{1 - 2\mu \cos(2\Pi F_2 \Delta t)z^{-1} + \mu^2 z^{-2}}$$

Since only simple processing steps are involved, and which are used either for detecting voice and for determining the values of the frequencies, the amount the digital processing resources can be limited.

As it will appear from the detailed description of the preferred embodiment of the invention, the method is particularly useful for processing DTMF signals and also in the voice-server applications.

DESCRIPTION OF THE PREFERRED EMBODIMENT OF THE INVENTION

In the preferred embodiment of the invention, the voice-activity detection method provides the detection of the call-progress tones handled in a voice-server application based on a well-known RISC/6000 (trademark of IBM Corp,) host. The latter host computer is fitted with a particular voice-server application, such as banking or mail-order business applications. The host computer monitors several digital T1 or E1 links, what is achieved by means of specific cards providing the management of the primary digital links. Known cards for the RISC/6000 computer, which could advantageously embody the tone-detection method and call-progress mechanism according to the present invention, are known as "Voice-Server Card Adapter" and associated with "Voice pack" 9291 or 9295.

However, it should be understood that the invention is not limited to this specific host computer system and could be embodied in any telephone systems or voice-servers applications which must detect the voice in a signal where are numerous existing tones. Basically, each of the above mentioned cards are provided with Digital Signal Processing resources for handling the communication tasks which are likely to be requested by the voice-server application. Among others, these processing tasks comprise, in addition to the traditional DTMF and call-progress management functions, compression and decompression algorithms allowing to limit the size of the storage required for storing the numerous prompt messages used in the general application program running in the host computer, voice-recognition algorithm, echo-cancellation operations.

Figure 2:
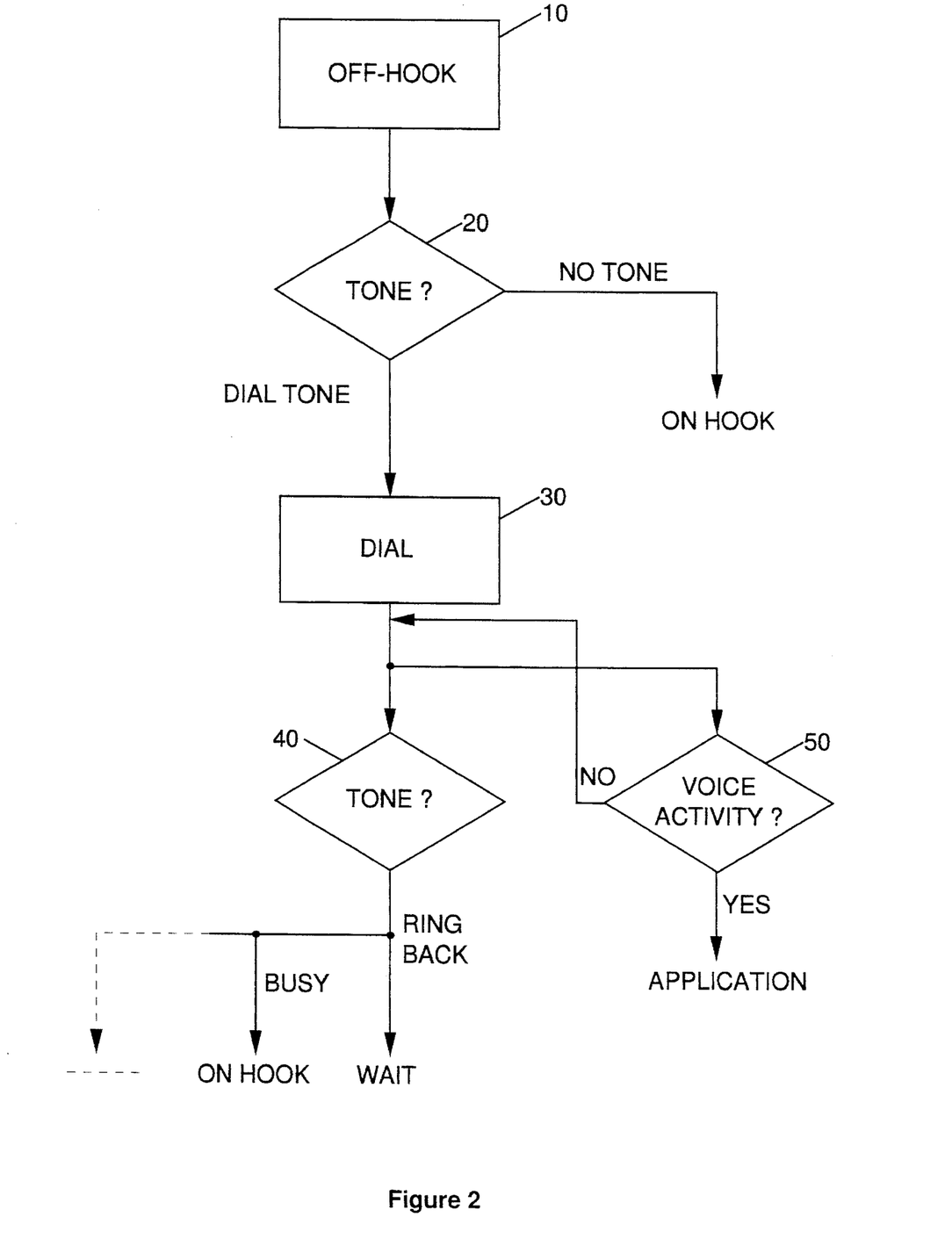
FIG. 2 is a flow chart detailing the time relationship between the voice-activity detection method and the processing of the call-progress tones.

FIG. 2 is an illustrative flow chart showing the technical steps which are required in the voice-server application, particularly including the voice,activity detection and the handling of the call-progress tones. Step 10, the equipment off-hooks in order to get the telephone line. Then, step 20, the signal on the line is analysed in order to detect the existence of the dial tone on the line. In this case, the dialing operation is performed in step 30. The dialing process is then followed by the detection of the different tones, step 40 (e.g. "ring-back" or "busy" tones) and simultaneously, the voice-activity detection method is performed in order to determine the moment when a person is hearing at the other side of the line.

Figure 3:
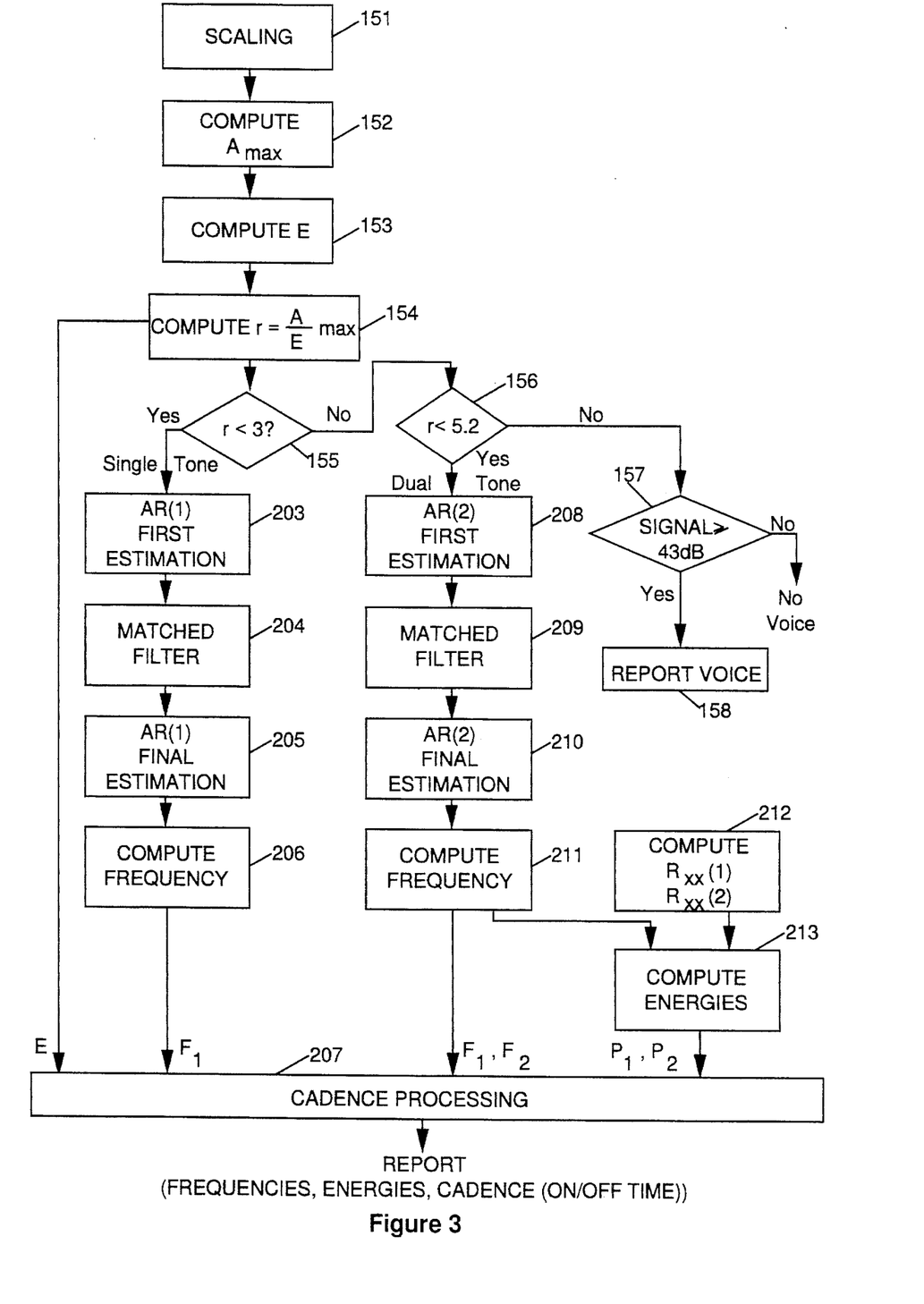
FIG. 3 shows the basic steps of the voice-activity detection process according to the present invention.

With respect to FIG. 3, there is shown the different technical steps which provides, simultaneously and without a great amount of digital signal processing resources, the detection of voice activity signals and the handling of the call-progress tones. Firstly, a scaling step 151 which is based on a traditional and basic μ or A law conversion is performed on the 64 Kbps digitized signal being received from the T1 or E1 digital linl. This eventually provides a twelve bit PMC sample stream at 8 Khz. This μ or A law conversion process is well-known in the art and will not be described with further details.

Then, With respect to FIG. 3 again, the maximum value of the received signal Amax in a set of k PCM samples in the considered sampling window is computed, step 152. In the preferred embodiment of the invention, this computation is made on a set of k=160 samples in a sampling window of 20 milliseconds. That computed result is then used for performing the computation of the energy E of the received signal, step 153. To achieve this, the digital processing means computes the mean square value of the PCM samples. Then, step 154, the following ratio R is computed in accordance with the formula:

$$\frac{A_{max}^2}{E}$$

where Amax represents the maximum value of the received signal and E the computed measure of the energy.

Then, a serie of tests are performed to determine the type of the received signal, that is to say whether the signal comprises an unique tone or two distinctive tones. Indeed, it appears that when the signal comprises an unique sinusoidal tone, it appears that the latter ratio is equal to 2, while the same reaches the value "4" in the case of two different tones. Also, it should be noticed that the value of this ratio does not depend on the value of the frequencies of the tones. Therefore, in step 155, if the computed ratio R is found to be inferior to 3, then the algorithm will conclude that an unique single tone is present in the received signal and the process will proceeds to step 203 where an accurate measure of the frequency value will be performed as described below with details.

In the reverse case, if the result of test step 155 indicates that the ratio R is superior to 3, then a supplementary test is performed, step 156, to compare that ratio to a value being approximatively equal to 5,2. If the ratio is inferior to 5.2, the process will conclude of the existence of a double tones in the received signals and the process will proceed to step 208 where the frequencies of those two tones will be performed. Conversely, if the above ratio is superior to 5.2, then an additional test step 157 is performed to determined whether the received signal is at a level which is at least equal to −43 dBm. In this case, the process concludes of the existence of some voice-activity in the received signal and will report this information to the voice-server application. On the contrary, if the received signal appears to have a level below −43 dBm, the process will conclude of the existence of pure noise signal and will not take further action.

Hereinafter will be described the further technical steps which provide the computation of the value of the frequency, both in the single tone or dual-tone detection. It will appear that only a few technical steps, most of which (such as the computation of Amax, E, and the above mentioned ratio) are used for both computing the single-tone or dual tone frequencies and for determining the presence of voice within the received signal. Therefore, a comprehensive voice-activity detection and tone-frequencies calculation process is provided which does not require a great amount of digital signal processing resources.

In the case of the detection of a single tone in the received signal, the process proceeds to step 203 where a first estimation of the autoregressive parameters of the signal is performed. This is performed by means of a second-order autoregressive process which is illustrated in the block diagram of FIG. 4.

Figure 4:
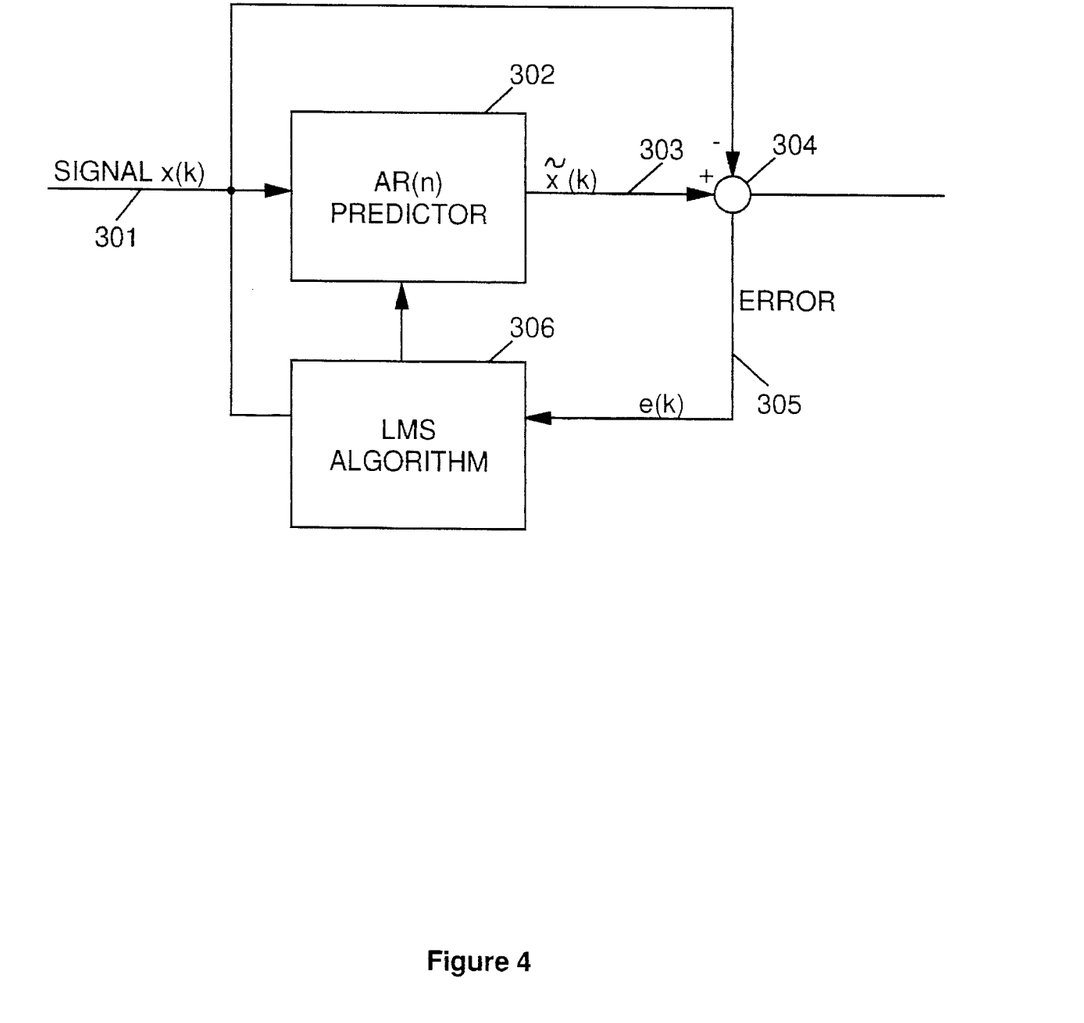
FIG. 4 details the principle of the auto-regressive modelization of the signal.

As illustrated, a AutoRegressive (AR) predictor block 302 provides the estimated signal. It is characterized by the following z-transfer function:

$$\frac{1}{a_1 \times z^{-1} + a_2 \times z^{-2}}$$

A substractor 304 computes the value of the error between the estimated value of $\tilde{x}$, and the received signal x. A least Mean Square block (LMS) 302 receiving the signal x and the estimated value of the error continuously adapts the value of the a1 parameter so that to minimize the estimated error. Since the signal received is supposed to be a sinusoidal tone, the a2 parameter is assumed to be equal to −1, and the autoregressive process is continuously performed with parameter a2 being equal to −1. This substantially minimizes the processing resources required for the AR algorithm and also increases the accuracy of the calculation on the a1 parameter.

The equation of the LMS block 302 is the following:

$$\alpha_1(k+1) = \alpha_1(k) + \beta \times e(k) \times x(k-1)$$

In the preferred embodiment of the invention, good results are particularly obtained when the value of beta is computed as follows:

$$\beta = \frac{\beta_0}{E}$$

where $\beta_0$ is a constant, and E is the value of the energy which was computed above.

With respect to FIG. 3 again, step 203 produces a first estimation of autoregressive parameter $\alpha_1$ of the received signal, as described with details above. Then, step 204, the process performs a digital band-pass filtering which is adjusted around the frequency of the tone which has been determined in step 203. The filtering process of step 204 is based on a first-order digital filter, which characteristics is adjusted so that to eliminate the most part of the noise signal existing around the detected tone. In the preferred embodiment of the invention, the first-order band pass filter is based on the following z-transfer function:

$$\frac{1}{1 - 2\mu \cos(2\Pi F\Delta t) \times z^{-1} + \mu^2 \times z^{-2}}$$

with $\mu$ being a parameter characterizing the selectivity of the filter. Preferably, this parameter has a value which is close to 1 so that to provide a high level of selectivity. In the preferred embodiment of the invention it is fixed to 0.92

It has been observed that this first-order filter substantially improves the tolerance of the overall algorithm to the noise, and eventually allows the processing of a signal having a degraded signal-to-noise ratio.

Then, step 205, a final estimation of the autoregressive parameters is performed. This is achieved by processing the filtered signal in accordance to the autoregressive block diagram of FIG. 4 which has been described with details below. Then, step 206, the value of the frequency is computed in accordance with the following equation:

$$\alpha_1 = 2\cos(2\Pi f\Delta t)$$

where $\Delta t$ corresponds to the sampling period.

Then, the process proceeds to cadence processing step 207 where the value and the duration of the tone is reported to the application program running in the host processor.

In the case where test of step 202 reveals the existence of dual tones in the received signal, then the process proceeds to step 208 where a four-order autoregressive process is performed. Similarly than above, this new AR process is based on the block diagram of FIG. 4, where the AR predictor block 302 now consists in a four-order predictor with the following z-transfer function:

$$\frac{1}{a_1 \times z^{-1} + a_2 \times z^{-2} + a_3 \times z^{-3} + a_4 \times z^{-4}}$$

where "a1, a2, a3 and a4" are the four parameters of the autoregressive modelization of the signal. Similarly than above, since the dual tones are expected to be pure sinusoidal tones, the value of the a3 and a4 are constantly fixed to be equal to a1 and -1. This makes easier the computation of the AR algorithm and also increases the accuracy of the frequency computation.

In the process of step 208, the LMS block 302 is characterized by the following equation:

$$\begin{cases} a_1(k+1) = a_1(k) + \beta e(k)(x(k-1) + x(k-3)) \\ a_2(k+1) = a_2(k) + \beta e(k) \times x(k-2) \end{cases}$$

On the completion of the autoregressive process of step 208, a dual digital band-pass filtering is performed which is adjusted to match 204 the two frequencies which can be evaluated from the determination of the four above parameters. Similarly than above, this dual filtering is based on the combination of two first-order band-pass digital filters having the equation of:

$$\frac{1}{1 - 2\mu \cos(2\Pi F_1 \Delta t)z^{-1} + \mu^2 z^{-2}} + \frac{1}{1 - 2\mu \cos(2\Pi F_2 \Delta t)z^{-1} + \mu^2 z^{-2}}$$

with $\mu$ being again a parameter characteristic of the selectivity of the filter.

Then, step 210, a final estimation of the autoregressive parameters is performed as described above for the step 205. the accurate values of the dual frequencies can eventually been performed in step 211 in accordance with the following equations:

$$\begin{cases} a_1 = 2(\cos(2\Pi F_1 \Delta t) + \cos(2\Pi F_2 \Delta t)) \\ a_2 = -2 - 4\cos(2\Pi F_1 \Delta t)\cos(2\Pi F_2 \Delta t) \end{cases}$$

Once computed, the values of the two frequencies can be reported to the cadence processing routines in step 207 and then handled by the general application program running in the host computer.

Also, the respective energies of the two tones are computed. This is firstly performed by means of a calculation of the autocorrelation functions Rxx(1) and Rxx(2), step 212, in accordance with the well known relation:

$$R_{xx}(n) = \sum_{-\infty}^{+\infty} x(k) \times x(k+n)$$

Then, step 213, the following matricial equation is solved in order to compute the desired values P1 and P2 of the estimation of the energy of the two tones.

$$\begin{pmatrix} \cos 2\Pi F_1 \Delta t & \cos 2\Pi F_2 \Delta t \\ \cos 4\Pi F_1 \Delta t & \cos 4\Pi F_2 \Delta t \end{pmatrix} \begin{pmatrix} P_1 \\ P_2 \end{pmatrix} = \begin{pmatrix} R_{xx}(1) \\ R_{xx}(2) \end{pmatrix}$$

The computed values of P1 and P2 are then transmitted to the cadence processing functions in step 207. The knowledge of the values of the energies particularly facilitates the distinguishing of the periods where an actual(s) tone(s) exist(s) or not, and therefore improves the cadence processing operations of step 207.

Figure 5:
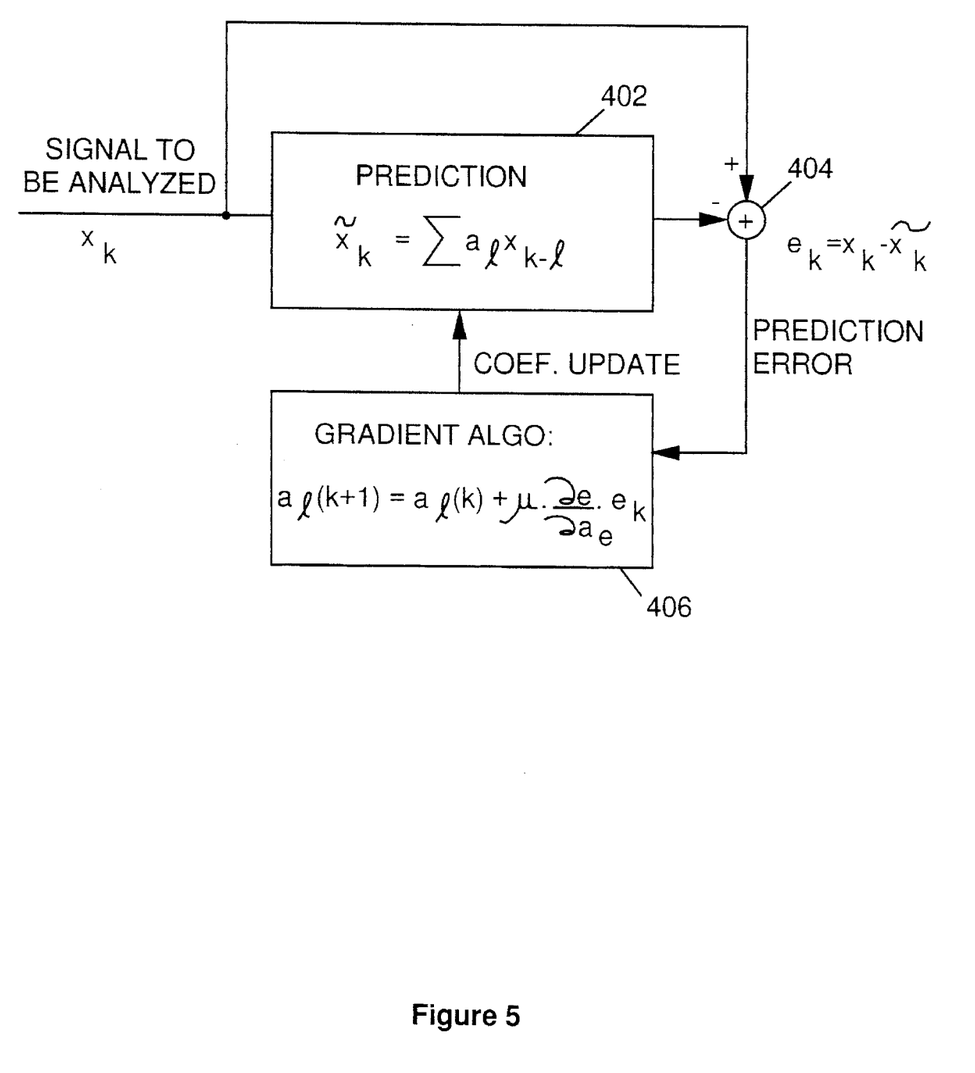
FIG. 5 is the principle of the auto-regressive algorithm in the case of n different tones.

FIG. 5 illustrates the Autoregressive process according to the present invention which provides the detection of n different tones in a received signal.

This is achieved by using using an AR block 402 based on the following equation:

$$x_k = \sum_{l=1}^{2p} a_l x_{k-l}$$

Similarly than above, the "al" coefficients are determined by LMS block 406 which continuously update the coefficient so that to minimize the error in accordance with the general relation:

$$\alpha_1(k+1) = \alpha_1(k) + \mu \cdot x_{k-1} \cdot e_k$$

Then the frequency are determined by the research of the roots of the equation:

$$z^{2p} + \alpha_1 z^{2p-1} + \ldots + \alpha_{2p} \text{ with } n=1, \ldots, p \text{ and } \alpha_i = \alpha_{2p-i}$$

The Energy for each tone is calculated in accordance with the following formula, and which will then be reported to the cadence process step 207 for validation purpose:

$$\begin{pmatrix} \cos(2\Pi F_1 \Delta t) \ldots \cos(2\Pi F_p \Delta t) \\ \vdots \\ \cos(4\Pi p F_1 \Delta t) \ldots \cos(2\Pi F_p p \Delta t) \end{pmatrix} \begin{pmatrix} P_1 \\ \vdots \\ P_p \end{pmatrix} = \begin{pmatrix} R_{xx}(1) \\ \vdots \\ R_{xx}(p) \end{pmatrix}$$

Figure 6:
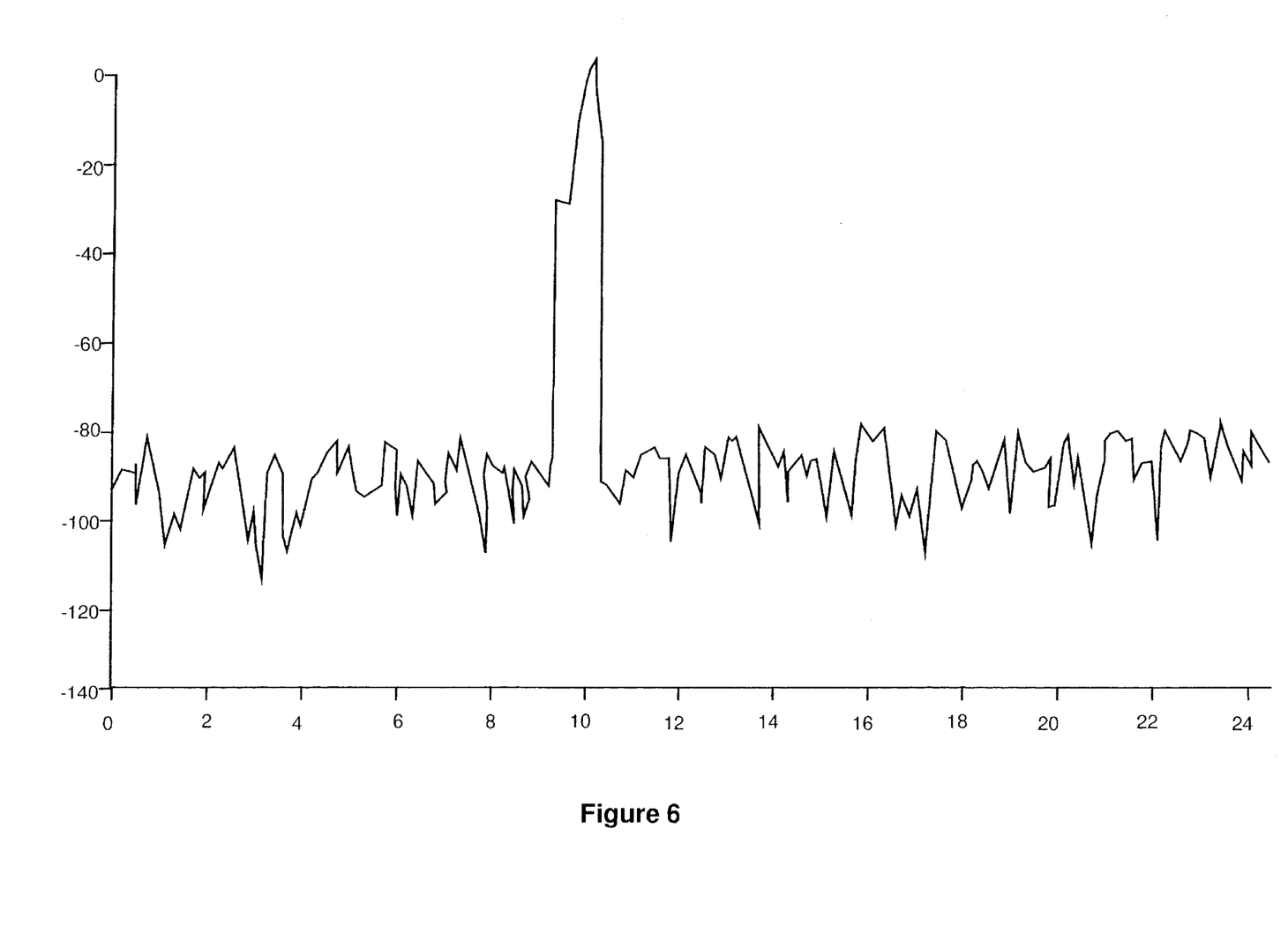
FIG. 6 and FIG. 7 are respectively illustrative diagram showing the capability of a FFT based method and the method according to the present invention to distinguish two closely spaced tones.
Figure 7:
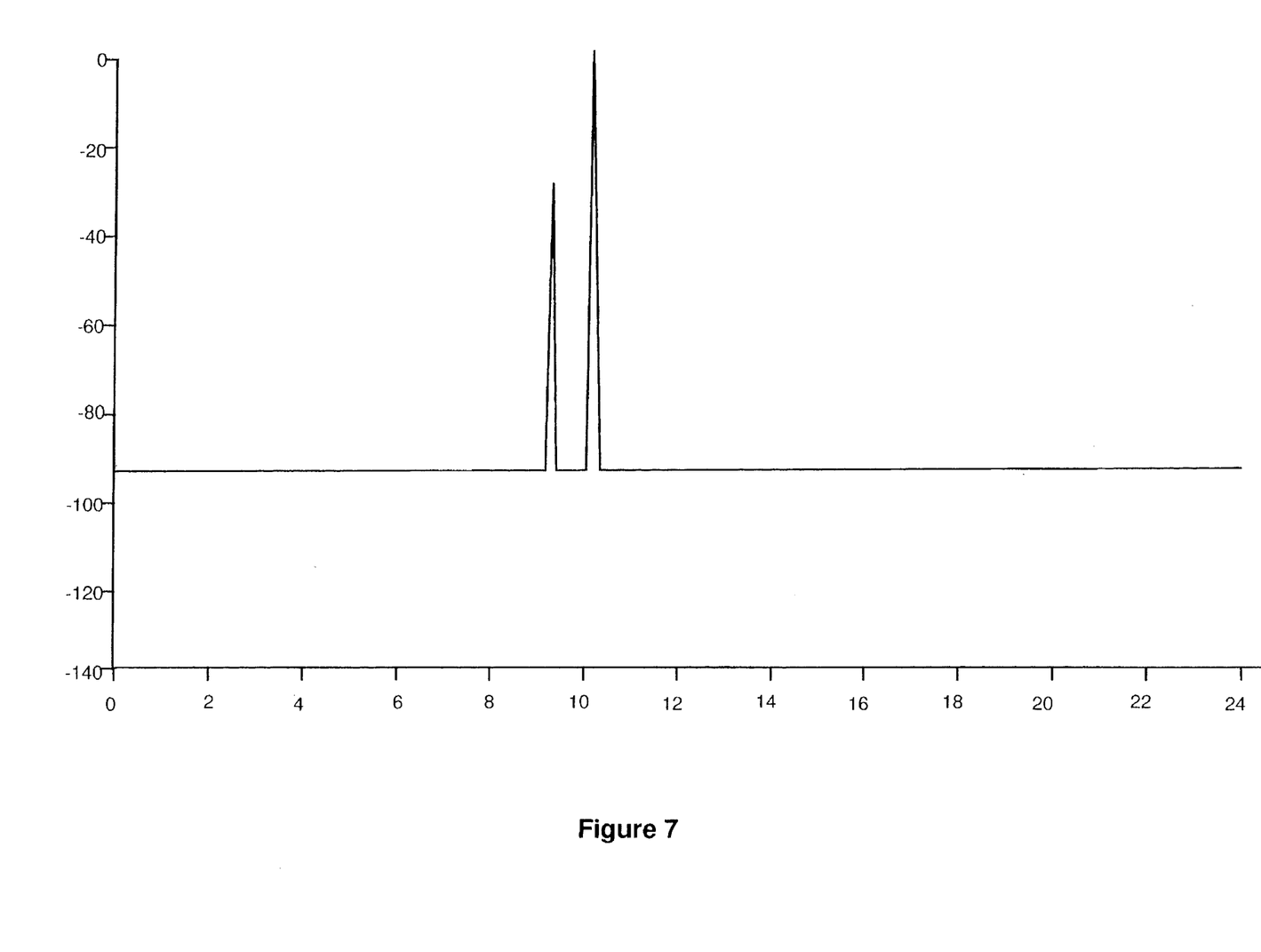

FIGS. 6 and 7 are respectively simulation diagrams illustrating the high level of discrimination of the tone-detection process used in the voice-activity method in accordance with the present invention with respect to the traditional FFT transformation. As is appears from the FIG. 6, the tone-detection method according to the present invention, while necessitating a reduced amount de digital signal processing resources, nevertheless provides the clear distinction of two closely related tones in a received signal.

We claim:

1. A method for detecting the presence of voice signals in a telephone network which also utilizes single and dual tone multifrequency signals for effecting network control including the steps:

receiving signals from the telephone network;

determining the maximum value A max of the received signal during a sampling window and a measure E of the energy;

computing the ratio, $$r = \frac{A^2 \max}{E}$$

comparing the said computed ratio r to a threshold value and measuring the signal level; and indicating voice activity only when the ratio r exceeds said threshold value of 5.2 and the received signal level exceeds a predetermined value of −43 db.

2. A method for determining the presence of voice signal tone multifrequency and dual tone multifrequency signals in signals provided over a telephone network including the following steps:

receiving the signals from the telephone network;

determining the maximum value A max of the received signal during a sampling window and a measure E of the energy;

computing the ratio, $$r = \frac{A^2 \max}{E}$$

comparing the said ratio r to a first threshold value of 3 and indicating receipt of a single tone signal when the value of the ratio r is less than the said first threshold value;

comparing the said ratio r to a higher second threshold value of 5.2 when the ratio r exceeds the said first threshold value and indicting receipt of a dual tone signal when the ratio r is less than the said second threshold value; and comparing the level of the received signal to a third threshold value −43 db when the ratio r exceeds the second threshold value and indicating the receipt of a voice signal only if the received signal level exceeds the said third threshold value.

3. Method according to claim 2 characterized in that, in response to the determination of an single tone in said received signal, it further involves the steps of:

applying a second-order autoregressive process and performing (203,208) a first estimation of the autoregressive parameters of said received signal, performing a digital band-pass filtering operation (205, 210) adjusted to the result of the estimation of said autoregressive parameters to provide a partial elimination of the noise existing on said received signal, reapplying (205, 210) a second-order autoregressive process and performing a final estimation of the autoregressive parameters of said received signal, and computing (206, 211) the value of the frequency of said single tone from said estimated parameter.

4. Method according to claim 2 characterized in that, in response to the determination of a dual tone in said received signal, it further involves the steps of:

applying a fourth-order autoregressive process and performing (203,208) a first estimation of the autoregressive parameters of said received signal, performing a digital band-pass filtering operation (205, 210) adjusted to the result of the estimation of said autoregressive parameters to provide a partial elimination of the noise existing on said received signal, reapplying (205,210) a fourth-order autoregressive process and performing a final estimation of the autoregressive parameters of said received signal, and computing (206, 211) the value of the frequency of the two tones from the value of said estimated parameters.

5. Method according to claim 3 characterized in that said first and said final second-order autoregressive process is based on a predicting function having the z-transfer equation:

$$\frac{1}{a_1 \times z^{-1} + a_2 \times z^{-2}}$$

and associated with a Least Mean Square algorithm which tends to adapt the parameters of said predicting function so that to minimize the error resulting from the difference between said received signal and the estimated signal computed from said z-transfer function.

6. Method according to claim 5 characterized in that said second-order autoregressive process is performed with the value of a2 parameter being constantly fixed to −1.

7. Method according to claim 5 characterized in that said digital filtering operation is based on a digital filter having the z-transfer function:

$$\frac{1}{1 - 2\mu \cos(2\Pi F \Delta t) \times z^{-1} + \mu^2 \times z^{-2}}.$$

8. Method according to claim 7 characterized in that said "mu" parameter is fixed to a value comprised within the range 0.90 and 0.95.

9. Method according to claim 4 characterized in that, in response to the determination of a dual-tone, said first and said final fourth-order autoregressive process is based on a predicting function having the z-transfer equation:

$$\frac{1}{a_1 \times z^{-1} + a_2 \times z^{-2} + a_3 \times z^{-3} + a_4 \times z^{-4}}$$

and associated with a Least Mean Square algorithm which tends to adapt the parameters of said predicting function so that to minimize the error resulting from the difference between said received signal and the estimated signal computed from said z-transfer function.

10. Method according to claim 9 characterized in that said fourth-order autoregressive process is performed with the value of a3 and a4 parameters being constantly fixed to a1 and −1.

11. Method according to claim 9 characterized in that said digital filtering operation is based on a digital filter having the z-transfer function:

$$\frac{1}{1 - 2\mu \cos(2\Pi F_1 \Delta t)z^{-1} + \mu^2 z^{-2}} + \frac{1}{1 - 2\mu \cos(2\Pi F_2 \Delta t)z^{-1} + \mu^2 z^{-2}}.$$

* * * * *